US007370181B2

(12) United States Patent
Mondal et al.

(10) Patent No.: US 7,370,181 B2
(45) Date of Patent: May 6, 2008

(54) SINGLE STEPPING A VIRTUAL MACHINE GUEST USING A REORDER BUFFER

(75) Inventors: Sanjoy K. Mondal, San Marcos, TX (US); Venkateswara Rao Madduri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 10/876,092

(22) Filed: Jun. 22, 2004

(65) Prior Publication Data

US 2005/0283586 A1 Dec. 22, 2005

(51) Int. Cl.
*G06F 7/38* (2006.01)
*G06F 9/00* (2006.01)
*G06F 9/44* (2006.01)

(52) U.S. Cl. .................. 712/227; 712/225; 712/245

(58) Field of Classification Search ............. 712/245, 712/225, 227
See application file for complete search history.

(56) References Cited

U.S. PATENT DOCUMENTS

| 5,625,788 | A  | * | 4/1997  | Boggs et al. ............... 712/214 |
| 5,729,728 | A  | * | 3/1998  | Colwell et al. ............. 712/234 |
| 5,764,938 | A  | * | 6/1998  | White et al. ................ 712/200 |
| 5,987,600 | A  | * | 11/1999 | Papworth et al. ........... 712/244 |
| 6,035,394 | A  | * | 3/2000  | Ray et al. .................... 712/245 |
| 6,192,464 | B1 | * | 2/2001  | Mittal ......................... 712/200 |
| 6,625,726 | B1 | * | 9/2003  | Clark et al. ................. 712/245 |
| 7,124,327 | B2 | * | 10/2006 | Bennett et al. ............... 714/38 |
| 2003/0061258 | A1 | * | 3/2003 | Rodgers et al. ............ 709/102 |
| 2004/0024993 | A1 | * | 2/2004 | Parthasarathy ............. 712/218 |

* cited by examiner

*Primary Examiner*—Eddie Chan
*Assistant Examiner*—Idriss Alrobaye
(74) *Attorney, Agent, or Firm*—Thomas R. Lane

(57) ABSTRACT

Embodiments of apparatuses, systems, and methods for single stepping a virtual machine guest using a reorder buffer are disclosed. In one embodiment, an apparatus includes a sequencer and a reorder buffer. The sequencer is to issue micro-operations. The reorder buffer is to signal the sequencer to signal the sequencer to issue micro-operations corresponding to a monitor trap flag event.

23 Claims, 6 Drawing Sheets

SINGLE STEPPING A VIRTUAL MACHINE GUEST USING A REORDER BUFFER

FIELD

Embodiments of the invention relate to virtual machine extension (VMX) architecture. More particularly, embodiments of the invention relate to a method and apparatus to enable single stepping a guest application in a virtual machine environment.

BACKGROUND

Virtual machine extension (VMX) architecture allows multiple software programs and operating systems to use the same microprocessor logic ("hardware") by allocating processor resources to various software applications and operating systems at different times. One feature of the VMX architecture allows software programs ("guest software") to be executed one instruction at a time. Executing instructions of a software program one at a time is typically used as a debug technique and may be referred to as "single stepping" the program.

The VMX architecture typically uses a virtual machine monitor (VMM) program that interfaces one or more software programs, such as a virtual machine (VM), to a single microprocessor or collection of processing elements. The guest software running on each VM may include a guest operating system and various guest software applications. Furthermore, an application and operating system running on a VMM may be collectively called a VM or a guest. FIG. 1 illustrates a prior art structure ("virtual machine environment") for interfacing guest software to a microprocessor. Specifically, FIG. 1 illustrates a VMM that interface two VMs ("guest software") to a microprocessor. The software running within each VM may include a guest operating system as well as various software applications. In order to interface each VM to processor resources, such as registers, memory, and input/output ("I/O") resources, state and control information is modified and otherwise tracked via a set of fields within a virtual machine control structure (VMCS). More specifically, a control structure, such as the VMCS, is typically used to pass control of and access to processor resources between the VMM and a VM guest.

One feature of the VMX architecture is the ability to single step through guest software. In order to single step through guest software, the VMM typically, among other things, sets a control field or bit, such as a called Monitor Trap Flag (MTF), in the VMCS.

After the MTF bit is set in the VMCS, the VMM may request a transfer of access and/or control of processor resources to the guest software. The VMM may request access to and/or control of processing resources by issuing an instruction, such as a VMLAUNCH or VMRESUME instruction. A VMLAUNCH instruction is typically executed in order to execute a guest application for the first time. Thereafter, a VMRESUME instruction may be used to perform the same function.

Prior art techniques of single stepping through a guest software routine or routines can often be susceptible failure if an event, such as an exception, occurs during the execution of the guest software. Typically, successful execution of instructions within a guest software context yields control to the VMM whenever a VM exit event occurs. However, some VMM instructions, such as VMLAUNCH and VMRESUME, which transfer control to guest, do not.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to virtual machine extension (VMX) architecture. More particularly, embodiments of the invention relate to a method and apparatus to enable single stepping of a guest application within a microprocessor or group of processing elements.

At least one embodiment of the invention described herein involves the use of event detection logic within a processor re-order buffer (ROB) to assist in single stepping guest software. Furthermore, at least one embodiment of the invention involves the use of prioritization logic within the ROB to assign appropriate priority to various events while single-stepping a guest software application.

Figure 1:
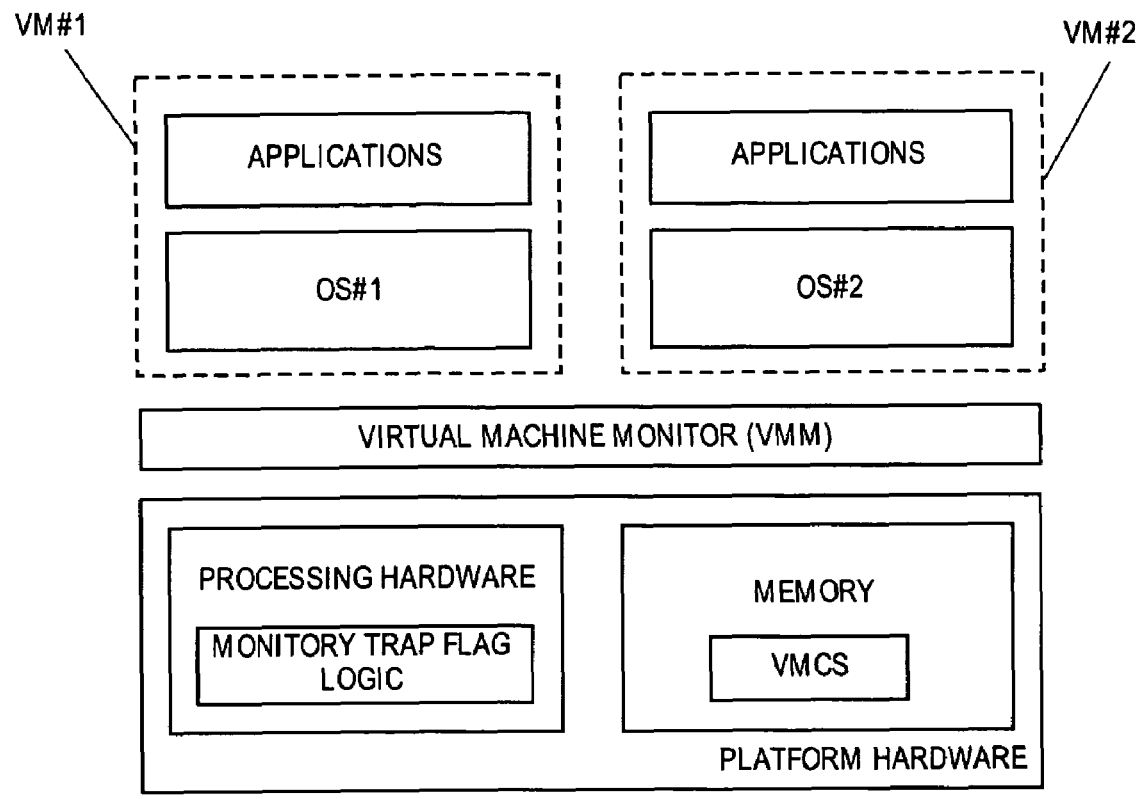
FIG. 1 illustrates a virtual machine environment, in which one embodiment of the invention may be used.
Figure 2:
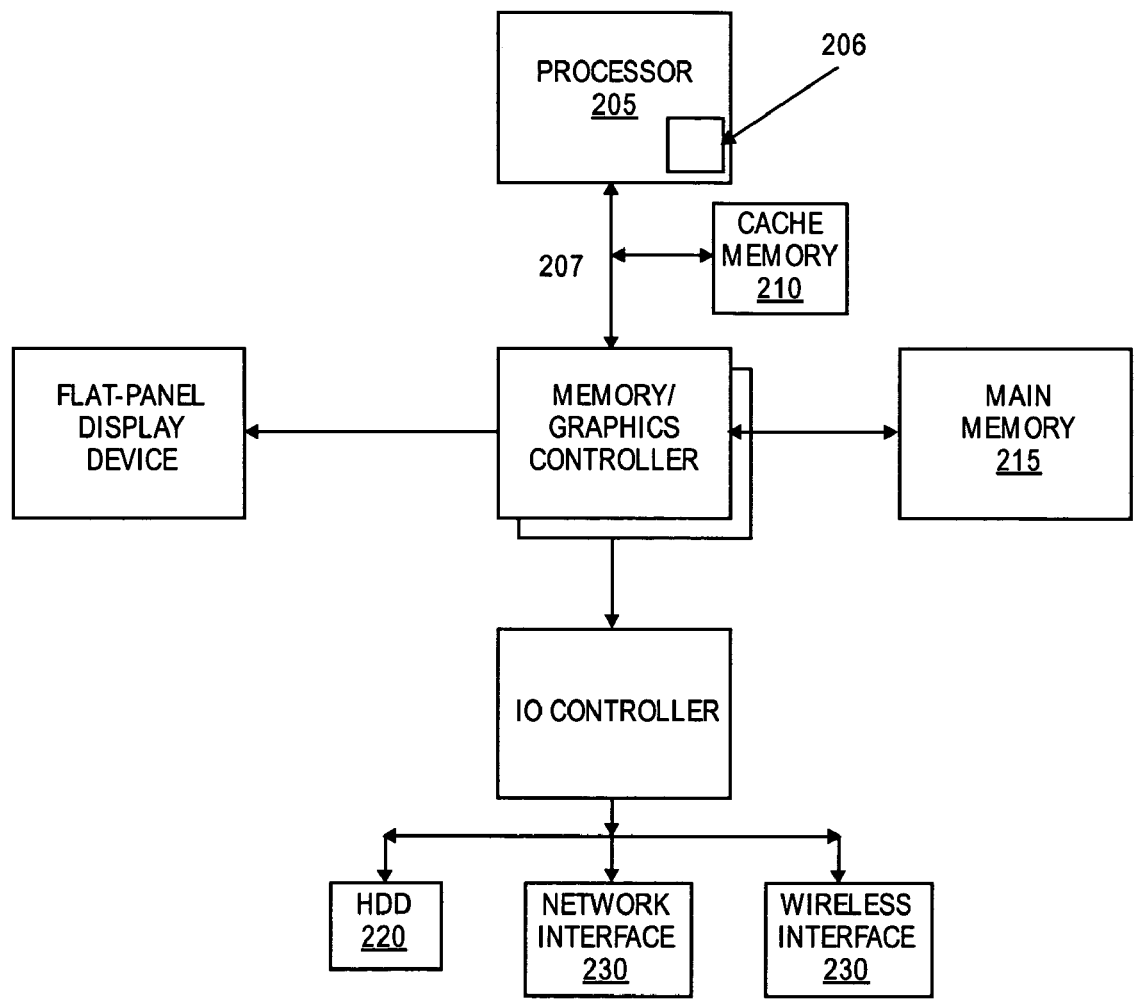
FIG. 2 illustrates a computer system in which at least one embodiment of the invention may be implemented.

FIG. 2 illustrates a computer system in which at least one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
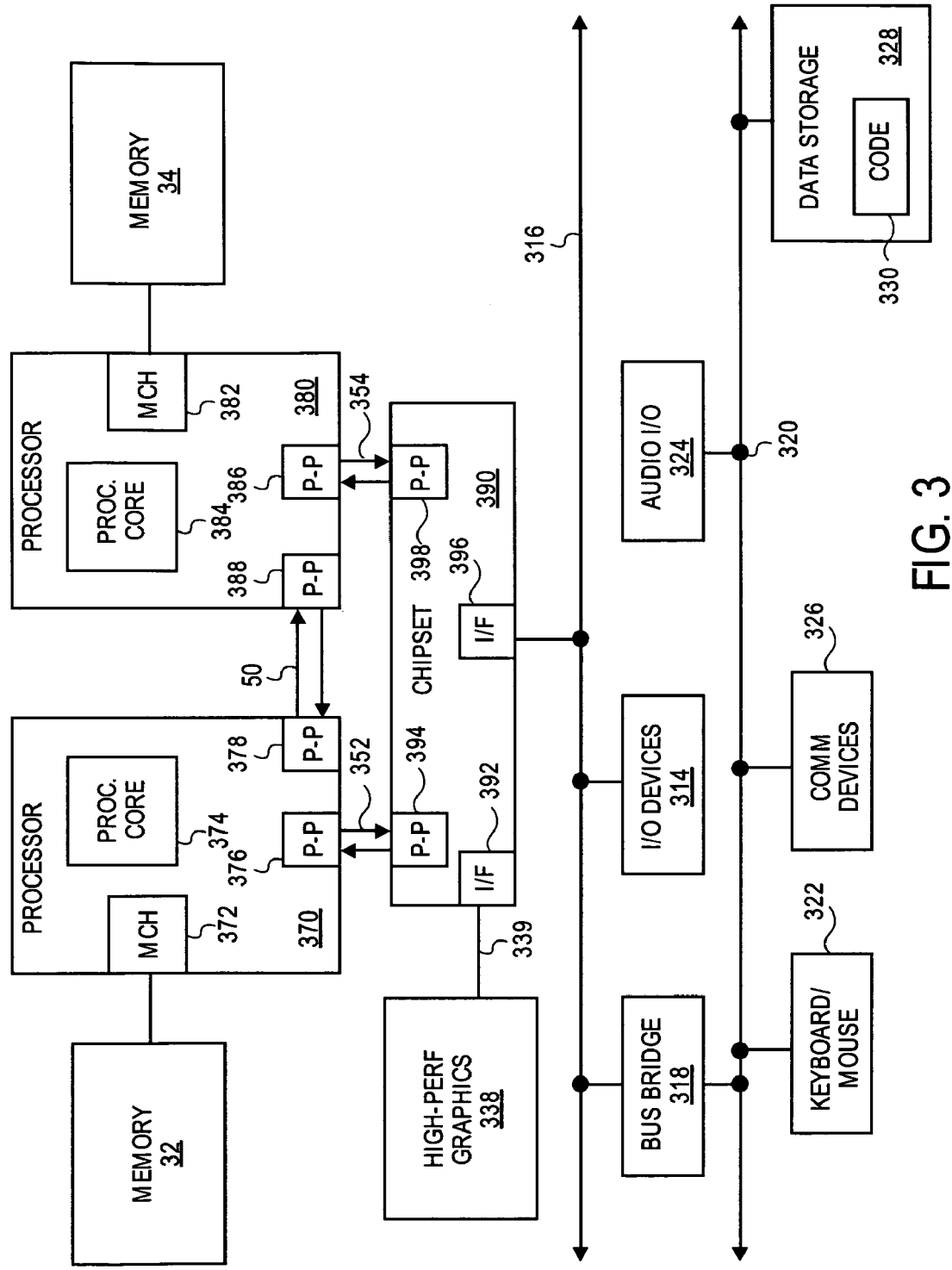
FIG. 3 illustrates a point-to-point (PtP) computer system in which one embodiment of the invention may be implemented.

FIG. 3 illustrates a computer system that is arranged in a point-to-point (PtP) configuration. In particular, FIG. 3 shows a system where processors, memory, and input/output devices are interconnected by a number of point-to-point interfaces.

The FIG. 3 system may also include several processors, of which only two, processors 370, 380 are shown for clarity. Processors 370, 380 may each include a local memory controller hub (MCH) 372, 382 to connect with memory 32, 34. Processors 370, 380 may exchange data via a point-to-point interface 350 using point-to-point interface circuits 378, 388. Processors 370, 380 may each exchange data with a chipset 390 via individual point-to-point interfaces 352, 354 using point to point interface circuits 376, 394, 386, 398. Chipset 390 may also exchange data with a high-performance graphics circuit 338 via a high-performance graphics interface 392.

At least one embodiment of the invention may be located within the memory controller hub 372 or 382 of the processors. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
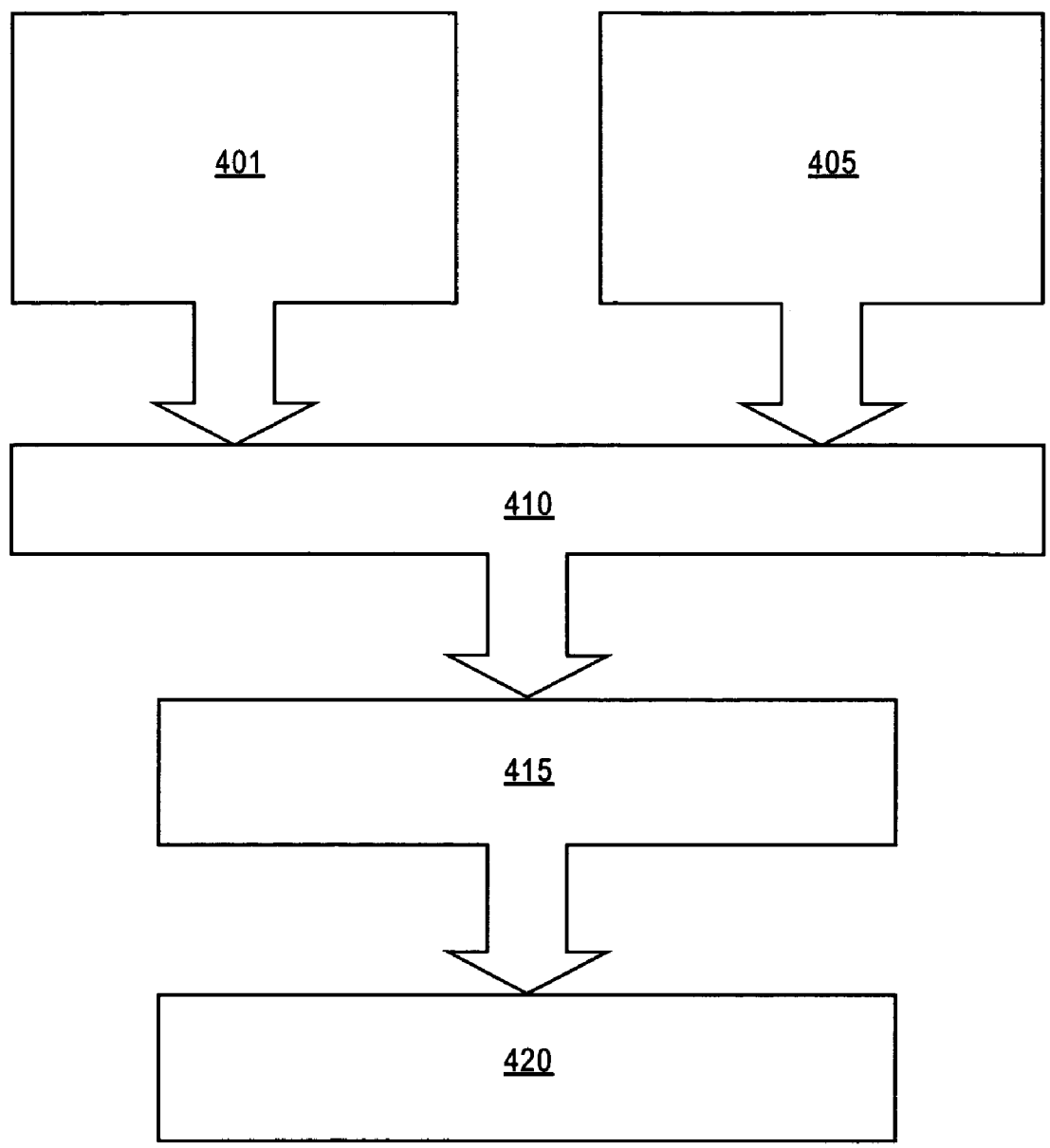
FIG. 4 illustrates an event handling technique within a re-order buffer (ROB) to facilitate single stepping of a guest application according to one embodiment of the invention.

FIG. 4 illustrates an event handling technique within a re-order buffer (ROB) to facilitate single stepping of a guest application according to one embodiment of the invention. Internal events 401 or external events 405 are detected 410 by detection logic within the ROB. After the events are detected, they are prioritized 415 so as to allow for the proper handling of the events. For example, in one embodiment of the invention, an MTF event initiated by a guest instruction will be prioritized by prioritization logic within the ROB above other internal or external events so that VMM may use the processor resource before servicing those events. The ROB allows a sequencer to issue the appropriate micro-operations (uops) to service the event(s).

Figure 5:
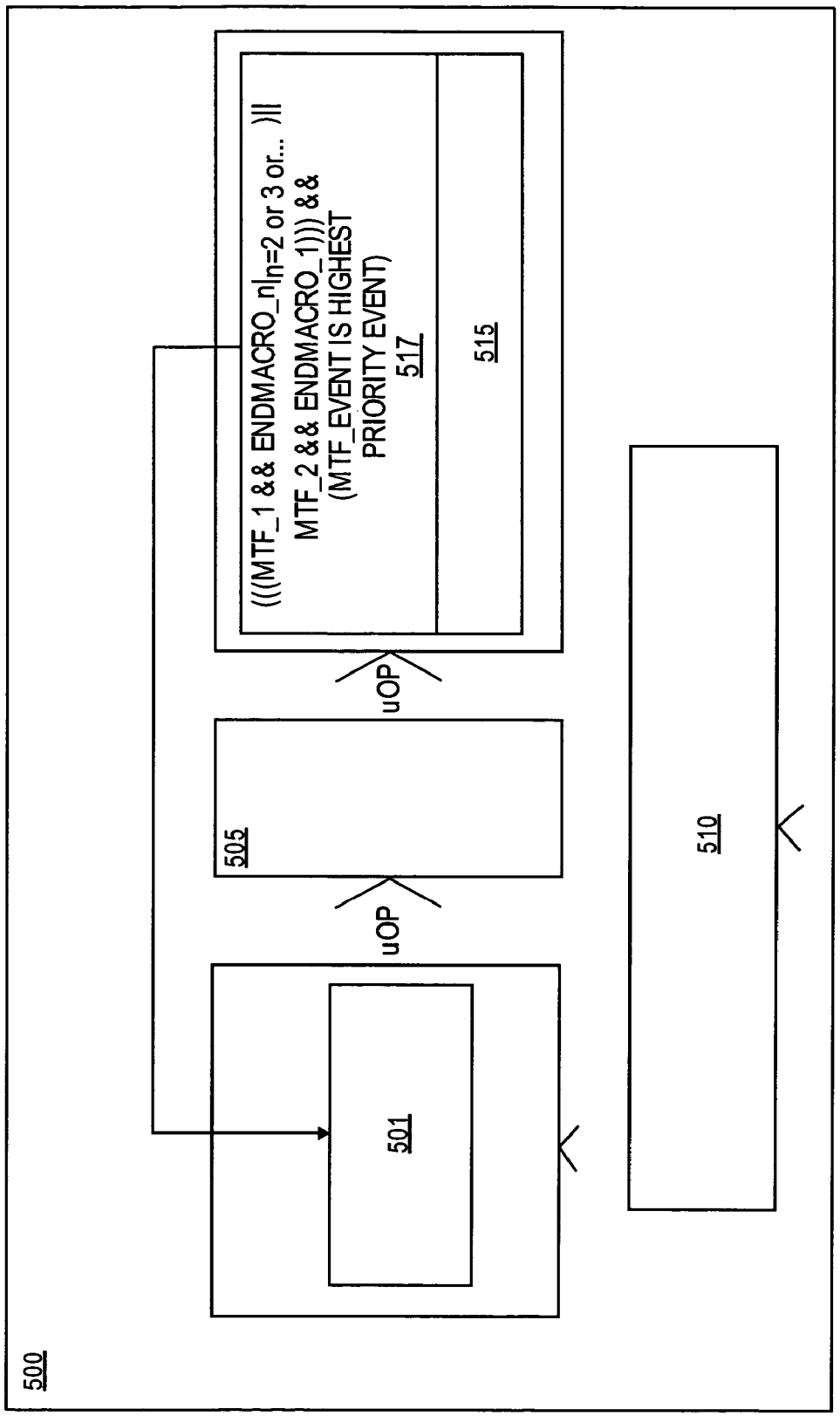
FIG. 5 illustrates processor architecture logic to facilitate monitor trap flag (MTF) event detection and servicing according to one embodiment of the invention.

FIG. 5 illustrates a microprocessor architecture for implementing at least one embodiment of the invention. The processor architecture 500 of FIG. 5 has a sequencer 501 that issues uops associated with a particular instruction to an execution unit 505. The instructions are retrieved from memory via an instruction fetch unit 510, which provides these instructions to the sequencer in order to translate the instruction to uops. Instructions and their associated uops may be executed out of order, but the ROB 515 retires the uops and instructions in program order.

In one embodiment of the invention, the ROB detects and prioritizes the uops retrieved from the execution unit and signals the sequencer to issue instructions commensurate with the detection and prioritization. In order for the ROB to detect an event, such as an MTF event caused by a guest instruction, two control bits are used in one embodiment. The control bits, MTF_1 and MTF_2, are set by an instruction associated with the MTF event to indicate that a guest instruction wishes to gain use of processor resources.

In at least one embodiment, after setting the MTF control bit in the execution control information in VMCS, VMM requests the transfer of control of processor resources to guest software by issuing a VMLAUNCH or VMRESUME instruction. The VMLAUNCH or VMRESUME instruction (whichever is issued) is then decoded into individual micro-operations (uops).

During execution of the first uop of VMLAUNCH or VMRESUME, the MTF_1 and MTF_2 bits are set to the same value, such as a logical "0" value. Subsequent uops may set the MTF_1 to another value, such as a logical "1" value. If the last uop of VMLAUNCH or VMRESUME, which is indicated by an encoded label, ENDMACRO_1, is retired having MTF_1=1 and MTF_2=0, for example, then no MTF event is generated and the processor may start executing first guest instruction.

The ROB recognizes the beginning of the uops associated with the first guest instruction by the presence of a label associated with the first uop of the guest instruction, such as "BEGINMACRO". After the ROB has detected the encoded label, it sets MTF_1 and MTF_2 bits to the same value, such as a logical "1" value.

The ROB can recognize the end of the guest instruction by detecting another label associated with the last uop of the first guest instruction, such as "ENDMACRO_n". After detecting either set MTF control bit and the ENDMACRO_n label, the ROB determines which event among all concurrent events being detected is highest priority and allows the sequencer to issue uops commensurate with the appropriately prioritized event. The logic performed by the ROB to perform the detection and prioritization is illustrated by the pseudo-code 517 in FIG. 5.

For example, if the MTF event caused by the detection of the last uop associated with the guest instruction is highest priority among all concurrently detected events, the ROB allows the sequencer to issue uops associated with an MTF event handling routine. Otherwise, the ROB may signal the sequencer to issue uops associated with a higher priority event, such as a fault or exception.

In order to transition from the execution of a guest instruction, such as in the case of single-stepping, the ROB, in at least one embodiment, will signal the sequencer to issue uops associated with a virtual machine (VM) exit routine, which, among other things, will reset the MTF control bits inside the ROB to "0", for example, in order to prevent another MTF event before another VMLAUNCH or VMRESUME instruction is issued by VMM.

Figure 6:
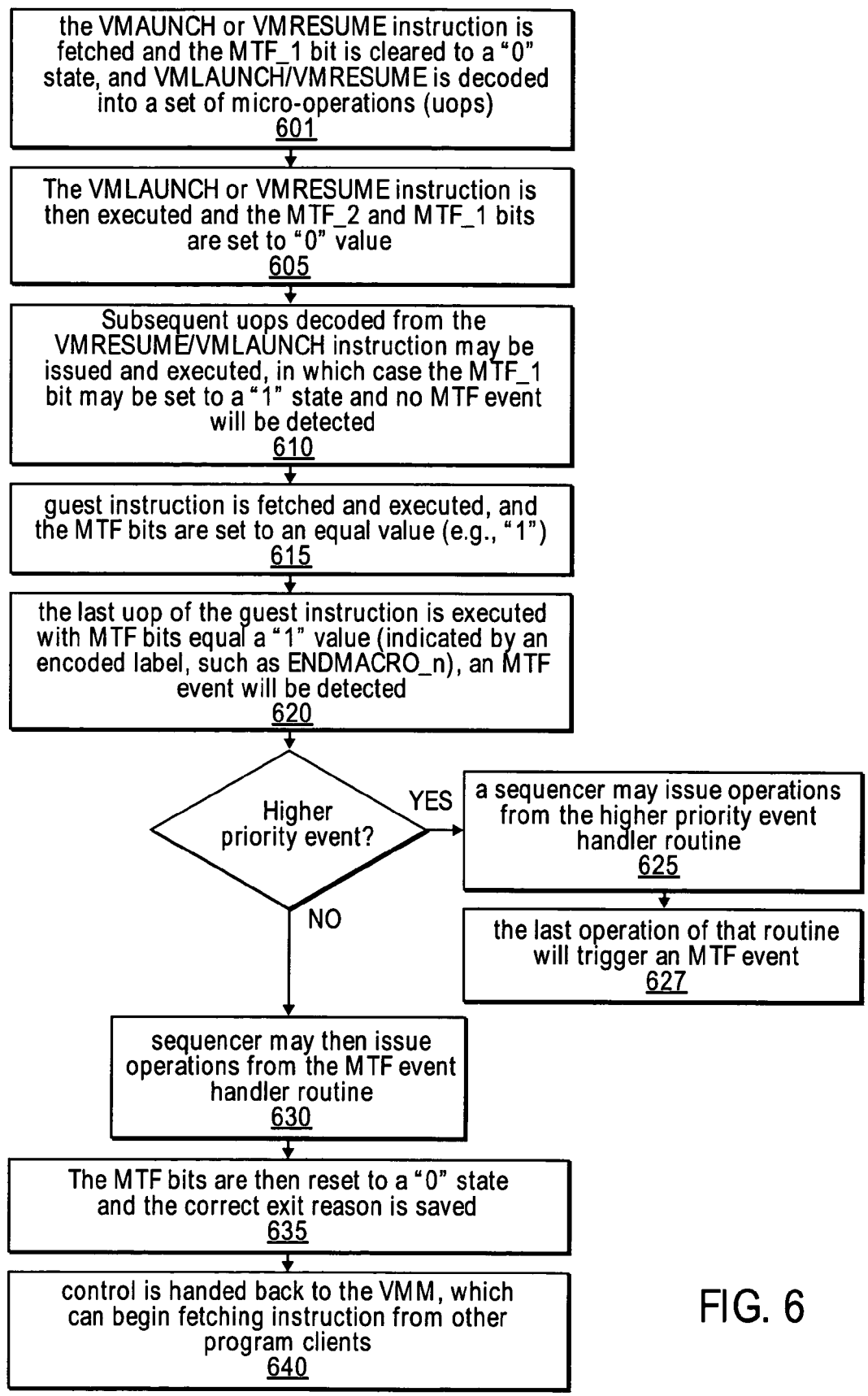
FIG. 6 is a flow diagram illustrating a technique to facilitate single stepping of a guest application according to one embodiment of the invention.

FIG. 6 is a flow diagram illustrating a method for performing at least one embodiment of the invention. At operation 601, the VMAUNCH or VMRESUME instruction is fetched and the MTF_1 bit is cleared to a "0" state, and VMLAUNCN/VMRESUME is decoded into a set of micro-operations (uops). The VMLAUNCH or VMRESUME instruction is then executed and the MTF_2 and MTF_1 bits are set to a "0" value at operation 605. Subsequent uops decoded from the VMRESUME/MLAUNCH instruction may be issued and executed, in which case the MTF_1 bit may be set to a "1" state and no MTF event will be detected. When subsequent uops decoded from VMLAUNCH/VMRESUME do in fact issue and are executed, MTF_1 will be set to a "1" value and MTF_2 will be set to a "0" value. Consequently, when the last uop decoded from VMLAUNCH/VMRESUME is executed, no MTF event will be detected at operation 610.

Next, the guest instruction is fetched and executed at operation 615, and the MTF bits are set to an equal value (e.g., "1"). If the last uop of the guest instruction is executed with MTF bits equal a "1" value (indicated by an encoded label, such as ENDMACRO_n), an MTF event will be detected at operation 620.

If a higher priority event occurs, a sequencer may issue operations from the higher priority event handler routine at operation 625 and the last operation of that routine will trigger an MTF event at operation 627. If no higher priority event occurs or after the higher priority event has been handled, the sequencer may then issue operations from the MTF event handler routine at operation 630. The MTF bits are then reset to a "0" state and the correct exit reason is saved at operation 635. At this point, control is handed back to the VMM, which can begin fetching instructions from other program clients at operation 640.

Any or all portions of the embodiments of the invention illustrated herein may be implemented in a number of ways, including, but not limited to, logic using complimentary metal-oxide-semiconductor (CMOS) circuit devices (hardware), instructions stored within a storage medium (software), which when executed by a machine, such as a microprocessor, cause the microprocessor to perform operations described herein, or a combination of hardware and software. References to "microprocessor" or "processor" made herein are intended to refer to any machine or device that is capable of performing operations as a result of receiving one or more input signals or instructions, including CMOS devices.

Although the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
   a sequencer to issue micro-operations (uops);
   a first control bit;
   a second control bit;
   logic to set the second control bit equal to the first control bit in response to execution of a first uop of an instruction, to set the first control bit to a first value in response to execution of a second uop of the instruction based upon the instruction being to transfer control of the apparatus to a virtual machine and the control structure for the virtual machine indicating that the virtual machine is to single step through guest software, and to compare the first and second control bits to the first value in response to execution of a last uop of the instruction;
   a re-order buffer (ROB) to signal the sequencer to issue uops corresponding to a monitor trap flag (MTF) event based upon the first control bit and the second control bit being equal to the first value during execution of the last uop of the instruction.

2. The apparatus of claim 1 wherein the last uop is indicated by a label detectable by the ROB.

3. The apparatus of claim 2 wherein the signal from the ROB to the sequencer is to cause the sequencer to issue uops to perform a virtual machine exit routine.

4. The apparatus of claim 3 wherein alter the virtual machine exit routine is complete, a virtual machine monitor (VMM) MTF handler is to be executed.

5. The apparatus of claim 4 wherein the virtual machine exit routine is to set the first and second control bits to a second value.

6. A system comprising:
   a processor comprising
      a sequencer to issue micro-operations (uops),
      a first control bit,
      a second control bit, and
      a re-order buffer (ROB);
   a memory unit to store a plurality of instructions, including a virtual machine entry instruction to transfer control of the processor to a virtual machine and a monitor trap flag (MTF) handler instruction, and a control structure for the virtual machine;
   wherein the ROB is to set the second control bit equal to the first control bit in response to execution of a first uop of an instruction, to set the first control bit to a first value in response to execution of a second uop of the instruction based upon the instruction being the virtual machine entry instruction and the control structure indicating that the virtual machine is to single step through guest software, and to compare the first and second control bits to the first value in response to execution of a last uop of the instruction, and cause the MTF handler instruction to be executed based upon the first control bit and the second control bit being equal to the first value during execution of the last uop of the instruction.

7. The system of claim 6 wherein the ROB is to signal the sequencer to issue a virtual machine exit routine after detecting that the first control bit and the second control bit are equal to the first value during execution of the last uop of the instruction.

8. The system of claim 7 wherein a single guest instruction is executed by the processor based upon the ROB detecting that the first control bit and the second control bit are equal to the first value during execution of the last uop of the instruction.

9. The system of claim 8 wherein the virtual machine exit routine is to set the first and second control bits to a second value.

10. The system of claim 9 wherein the MTF handler instructions are to be executed after the virtual machine exit routine completes.

11. The system of claim 10 wherein the last uop is associated with an ENDMACRO label to indicate to the ROB the presence of the last uop.

12. A method comprising:
    fetching an instruction;
    executing a first micro-operation (uop) of the instruction;
    setting a first control bit equal to a second control bit in response to execution of the first uop of the instruction;
    executing a second uop of the instruction;
    setting the second control bit to a first value in response to execution of the second uop of the first instruction based upon the instruction being to transfer control of a processor to a virtual machine and the control structure for the virtual machine indicating that the virtual machine is to single step through guest software;
    executing a last uop of the instruction;
    comparing the first and second control bits to the first value in response to executing the last uop of the instruction; and
    executing an MTF handler based upon the first and second control bits being equal to the first value during execution of the last uop of the instruction.

13. The method of claim 12 further comprising executing a virtual machine exit routine based upon the first and second control bits being equal to the first value during execution of the last uop of the instruction.

14. The method of claim 13 further comprising executing a virtual machine monitor handler routine in response to executing the virtual machine exit routine.

15. The method of claim 13 wherein the virtual machine monitor routine sets the first and second bits to a second value that prevents further MTF events being detected.

16. The method of claim 15 further comprising executing a virtual machine monitor exception handler based upon an exception occurring during the execution of the last uop.

17. The method of claim 15 further comprising executing a virtual machine monitor fault handler based upon a fault occurring during the execution of the last uop.

18. A machine-readable medium having stored thereon a set of instructions, which when performed by a machine, cause the machine to perform a method comprising:
fetching an instruction;
executing a first micro-operation (uop) of the instruction;
setting a first control bit equal to a second control bit in response to execution of the first uop of the instruction;
executing a second uop of the instruction;
setting the second control bit to a first value in response to execution of the second uop of the first instruction based upon the instruction being to transfer control of a processor to a virtual machine and the control structure for the virtual machine indicating that the virtual machine is to single step through guest software;
executing a last uop of the instruction;
comparing the first and second control bits to the first value in response to executing the last uop of the instruction; and
executing an MTF handler based upon the first and second control bits being equal to the first value during execution of the last uop of the instruction.

19. The machine-readable medium of claim 18 wherein the MTF handler includes a virtual machine exit routine to give program control back to a virtual machine monitor program.

20. The machine-readable medium of claim 19 wherein the virtual machine exit routine sets the first and second bits to a second value to prevent another MTF event from occurring.

21. The machine-readable medium of claim 20 wherein the MTF handler further comprises a virtual machine monitor handler.

22. The machine-readable medium of claim 21 wherein the last uop is a labeled with an ENDMACRO label.

23. The machine-readable medium of claim 18 wherein the comparing is performed by logic within a re-order buffer of the processor.

* * * * *